United States Patent

Garry

(10) Patent No.: US 9,498,848 B2
(45) Date of Patent: Nov. 22, 2016

(54) METHOD OF MANUFACTURING A WALL

(71) Applicant: ROLLS-ROYCE PLC, London (GB)

(72) Inventor: Ian Murray Garry, Thurcaston (GB)

(73) Assignee: ROLLS-ROYCE plc, London (GB)

(*) Notice: Subject to any disclaimer, the term of this patent is extended or adjusted under 35 U.S.C. 154(b) by 412 days.

(21) Appl. No.: 14/108,742

(22) Filed: Dec. 17, 2013

(65) Prior Publication Data

US 2014/0212317 A1    Jul. 31, 2014

(30) Foreign Application Priority Data

Jan. 30, 2013  (GB) .................................. 1301624.1

(51) Int. Cl.
*B22F 5/12* (2006.01)
*B23K 26/34* (2014.01)
*B22F 5/00* (2006.01)
*B22F 5/10* (2006.01)
*F23R 3/00* (2006.01)
*B22F 3/105* (2006.01)
*B29C 67/00* (2006.01)

(52) U.S. Cl.
CPC ............ *B23K 26/345* (2013.01); *B22F 3/1055* (2013.01); *B22F 5/008* (2013.01); *B22F 5/009* (2013.01); *B22F 5/10* (2013.01); *B23K 26/342* (2015.10); *F23R 3/002* (2013.01); *B22F 2005/004* (2013.01); *B23P 2700/13* (2013.01); *B29C 67/0077* (2013.01); *F23R 2900/00018* (2013.01); *F23R 2900/03041* (2013.01); *F23R 2900/03044* (2013.01); *Y02P 10/295* (2015.11)

(58) Field of Classification Search
CPC .................................................... B22F 3/1055
See application file for complete search history.

(56) References Cited

U.S. PATENT DOCUMENTS

| 5,435,139 A | 7/1995 | Pidcock et al. |
| 5,798,469 A | 8/1998 | Nufer |
| 6,857,275 B2 | 2/2005 | Pidcock et al. |
| 2013/0264750 A1 | 10/2013 | Hofacker et al. |

FOREIGN PATENT DOCUMENTS

| DE | 10 2010 041 284 A1 | 3/2012 |
| WO | WO 2009/126403 A2 | 10/2009 |
| WO | WO 2009/126534 A1 | 10/2009 |
| WO | WO 2009/148680 A2 | 12/2009 |
| WO | WO 2010/008633 A2 | 1/2010 |
| WO | WO 2010/105007 A2 | 9/2010 |

OTHER PUBLICATIONS

Search Report issued in European Patent Application No. 13 19 7680 dated Mar. 19, 2014.
Search Report issued in British Application No. 1301624.1 dated Jul. 29, 2013.

*Primary Examiner* — George Wyszomierski
*Assistant Examiner* — Ngoclan T Mai
(74) *Attorney, Agent, or Firm* — Oliff PLC

(57) ABSTRACT

A method of manufacturing an annular wall (46) of a combustion chamber (15) comprises depositing layers of a metal sequentially one upon the other to form layers of a spiral wall (45) of the combustion chamber (15). Each layer of metal is deposited in a spiral pathway (122). The ends (E1, E2) of the spiral wall (45) of the combustion chamber (15) are joined together to form the annular wall (46) of the combustion chamber (15). The ends (E1, E2) of the spiral wall (45) of the combustion chamber (15) are at the opposite ends of the spiral pathway (122).

26 Claims, 5 Drawing Sheets

METHOD OF MANUFACTURING A WALL

FIELD OF THE INVENTION

The present invention relates to a method of manufacturing a wall and in particular to a method of manufacturing an annular wall of a gas turbine engine combustion chamber.

BACKGROUND TO THE INVENTION

Gas turbine engine combustion chambers experience extremely high temperatures in operation and the walls of the combustion chambers are generally cooled using a coolant.

It is known to provide a combustion chamber comprising an inner wall and an outer wall and the inner wall of the combustion chamber comprising segments, or tiles, and in particular the inner wall comprises a plurality of segments, or tiles, supported on the outer wall. The tiles consist of high temperature resistant material, e.g. a nickel base superalloy. The tiles are spaced from the inner surface of the outer wall to provide a passage for coolant. The outer wall of the combustion chamber may have apertures extending therethrough to provide impingement cooling of the outer surfaces of the tiles. The tiles may have pedestals projecting from their outer surfaces to provide convection cooling of the tiles. The tiles may have apertures extending therethrough to provide film cooling, or effusion cooling, of the inner surfaces of the tiles. The tiles may have a thermal barrier coating on their inner surface to provide further protection for the inner surfaces of the tiles.

Each tile is generally mounted on the outer wall using studs which are integral with the tile and which extend through mounting apertures in the outer wall. The studs are generally threaded and washers and nuts are fastened onto the studs.

Our U.S. Pat. No. 5,435,139 discloses an outer wall of a combustion chamber with apertures extending there-through to provide impingement cooling of the outer surfaces of the tiles and apertures extending through the tiles to provide film cooling, or effusion cooling, of the inner surfaces of the tiles. U.S. Pat. No. 5,435,139 uses threaded studs and nuts to mount the tiles on the outer wall.

Our U.S. Pat. No. 6,857,275 discloses an outer wall of a combustion chamber with apertures extending there-through to provide impingement cooling of the outer surfaces of the tiles, pedestals projecting from the outer surfaces of the tiles to provide convection cooling of the tiles and apertures extending through the tiles to provide film cooling, or effusion cooling, of the inner surfaces of the tiles. U.S. Pat. No. 6,857,275 uses threaded studs and nuts to mount the tiles on the outer wall.

The outer wall of the combustion chamber is generally manufactured as an annular outer wall. One conventional method of manufacturing an annular outer wall comprises forging a metal billet into a forged ring, turning the forged ring and then drilling apertures through the forged ring. Another conventional method of manufacturing an outer annular wall comprises forming sheet metal pieces, welding the pieces together to form a ring and then drilling apertures through the fabricated ring.

The inner wall of the combustion chamber is generally manufactured by casting the tiles, drilling apertures through the tiles and then coating the inner surfaces of the tiles with a thermal barrier coating.

Finally the tiles of the inner wall are assembled onto the outer wall by inserting the studs on the tiles through cooperating mounting apertures in the outer wall and then placing washers and nuts on each of the studs.

Thus, the method of manufacturing each wall of a combustion chamber is complicated and requires a number of manufacturing processes, e.g. casting, drilling and depositing a coating for a tile of the inner wall or forging, turning and drilling of the outer wall.

The present invention seeks to provide a novel method of manufacturing a wall of a combustion chamber which reduces, preferably overcomes, the above-mentioned problem.

STATEMENTS OF INVENTION

Accordingly the present invention provides a method of manufacturing a wall, the method comprising
(a) depositing layers of a metal sequentially one upon the other to form layers of a spiral wall, depositing each layer of metal in a spiral pathway, and
(b) joining the ends of the spiral wall to form an annular wall, the ends of the spiral wall being at the opposite ends of the spiral pathway or cutting the spiral wall into portions to form a plurality of wall portions.

Step (b) may comprise rolling the spiral wall into a ring before joining the ends of the spiral wall together or rolling the spiral wall flat before cutting the spiral wall into a plurality of wall portions.

Step (a) may comprise controlling the deposition of the layers of metal to form apertures in the spiral wall.

Step (a) may comprise: —
(i) depositing a layer of a metal powder onto a platform,
(ii) directing a radiation beam in at least one spiral pathway onto the layer of metal powder deposited in step (i) to melt and sinter the metal powder to form a layer of the spiral wall,
(iii) depositing a further layer of a metal powder onto the previously deposited layer of metal powder,
(iv) directing a radiation beam in at least one spiral pathway onto the layer of powder metal deposited in step (iii) to melt and sinter the metal powder to form a further layer of the spiral wall and to bond the further layer of metal powder to the previously deposited layer of metal powder, and
(v) repeating steps (iii) and (iv) a plurality of times to build up the spiral wall.

Step (ii) may comprise directing a laser beam onto the layer of metal powder, directing a microwave beam onto the layer of metal powder or directing an electron beam onto the layer of metal powder.

Step (iv) may comprise directing a laser beam onto the layer of metal powder, directing a microwave beam onto the layer of metal powder or directing an electron beam onto the layer of metal powder.

Step (a) may be performed in a fused powder bed apparatus, the fused powder bed apparatus having base dimensions of 250 mm by 250 mm and the diameter of the annular wall is greater than 250 mm.

Step (a) may comprise: —
(i) depositing a layer of a molten metal in at least one spiral pathway onto a platform to form a layer of the spiral wall,
(ii) depositing a further layer of molten metal in at least one spiral pathway on the previously deposited layer of molten metal to form a further layer of the spiral wall and to bond the further layer of the spiral to the previously deposited layer of the spiral wall, and (iii) repeating step (ii) a plurality of times to build up the spiral wall.

Steps (i) and (ii) may comprise depositing the layer of molten metal using a welding torch.

The method may comprise depositing the layer of molten metal using a TIG welding torch.

Steps (i) and (ii) may comprise depositing the layer of molten metal by direct laser deposition.

The annular wall has an inner diameter and an outer diameter. The annular wall may be tubular and the inner diameter of the annular wall is substantially constant along the length of the annular wall and the outer diameter of the annular wall is substantially constant along the length of the annular wall. The annular wall may be frusto-conical and the inner diameter of the annular wall increases from a first end of the annular wall to a second end of the annular wall and the outer diameter of the annular wall increases from the first end of the annular wall to the second end of the annular wall. The inner diameter and the outer diameter of the annular wall may increase constantly from the first end to the second end of the annular wall. The inner diameter and the outer diameter of the annular wall may increase in a stepped manner from the first end to the second end of the annular wall.

Each layer of the spiral wall may have the same length to form a tubular annular wall. The layers of the spiral wall may have different lengths to form a frusto-conical annular wall.

The annular wall may be an annular wall of a combustion chamber.

Step (a) may comprise controlling the deposition of the layers of metal to form apertures in the additional spiral wall.

The apertures in the spiral wall may be dilution apertures and/or cooling apertures and/or mounting apertures.

Step (a) may comprise depositing layers of metal sequentially one upon the other to form a first spiral wall, a second spiral wall spaced from the first spiral wall and interconnecting structure connecting the first spiral wall and the second spiral wall to form a hollow spiral wall, and step (b) comprises joining the ends of the hollow spiral wall to form a hollow annular wall.

Step (a) may comprise controlling the deposition of the layers of metal to form apertures in the first spiral wall and the second spiral wall. The apertures in the first spiral wall and the second spiral wall may be dilution apertures and/or cooling apertures.

Step (a) may comprise depositing additional layers of a metal sequentially one upon the other to form layers of an additional spiral wall, each of the additional layers of metal being deposited in a spiral pathway, the additional spiral wall being spaced radially from the spiral wall, and depositing metal so as to interconnect the spiral wall and the additional spiral wall.

Step (a) may comprise controlling the deposition of the additional layers of metal to form apertures in the additional spiral wall.

The apertures in the additional spiral wall are dilution apertures and/or cooling apertures.

The annular wall may be an annular casing.

The annular casing may be a fan casing, a compressor casing, a combustion casing, a turbine casing or a combined combustion and turbine casing.

The method may comprise forming at least one annular flange extending radially inwardly or radially outwardly from the annular casing.

The present invention also provides a method of manufacturing an annular wall, the method comprising
(a) manufacturing a spiral wall, manufacturing the spiral wall by stacking layers of metal sequentially one upon the other to form layers of the spiral wall, depositing each layer of metal in a spiral pathway and
(b) joining the ends of the spiral wall to form the annular wall, the ends of the spiral wall being at the opposite ends of the spiral pathway.

The present invention also provides a method of manufacturing an annular wall of a combustion chamber, the method comprising
(a) depositing a layer of a metal powder onto a platform,
(b) directing a radiation beam in at least one spiral pathway onto the layer of metal powder deposited in step (a) to melt and sinter the metal powder to form a layer of a spiral wall of the combustion chamber,
(c) depositing a further layer of a metal powder onto the previously deposited layer of metal powder,
(d) directing a radiation beam in at least one spiral pathway onto the layer of powder metal deposited in step (c) to melt and sinter the metal powder to form a further layer of the spiral wall of the combustion chamber and to bond the further layer of metal powder to the previously deposited layer of metal powder, and
(e) repeating steps (c) and (d) a plurality of times to build up the spiral wall of the combustion chamber,
(f) rolling the spiral wall of the combustion chamber, and
(g) joining the ends of the spiral wall of the combustion chamber to form an annular wall of the combustion chamber, the ends of the spiral wall of the combustion chamber being at the opposite ends of the spiral pathway.

The present invention also provides a method of manufacturing an annular wall of a combustion chamber, the method comprising
(a) depositing a layer of a molten metal in at least one spiral pathway onto a platform to form a layer of a spiral wall of the combustion chamber,
(b) depositing a layer of molten metal in at least one spiral pathway on the previously deposited layer of molten metal to form a further layer of the spiral wall of the combustion chamber and to bond the further layer of the spiral wall to the previously deposited layer of the spiral wall,
(c) repeating step (b) a plurality of times to build up the spiral wall of the combustion chamber,
(d) rolling the spiral wall of the combustion chamber, and
(e) joining the ends of the spiral wall of the combustion chamber to form an annular wall of the combustion chamber, the ends of the spiral wall of the combustion chamber being at the opposite ends of the spiral pathway.

The present invention also provides a method of manufacturing a hollow wall, the method comprising
(a) depositing layers of a metal sequentially one upon the other to form layers of a spiral wall, depositing each layer of metal in a spiral pathway, depositing layers of metal sequentially one upon the other to form a first spiral wall, a second spiral wall spaced from the first spiral wall and interconnecting structure connecting the first spiral wall and the second spiral wall to form a hollow spiral wall, and
(b) joining the ends of the hollow spiral wall to form a hollow annular wall, the ends of the hollow spiral wall being at the opposite ends of the spiral pathway or rolling the hollow spiral wall to form a flat hollow wall and cutting the flat hollow wall into portions to form a plurality of flat hollow wall portions.

BRIEF DESCRIPTION OF THE DRAWINGS

The present invention will be more fully described by way of example with reference to the accompanying drawings, in which: —

DETAILED DESCRIPTION

Figure 1:
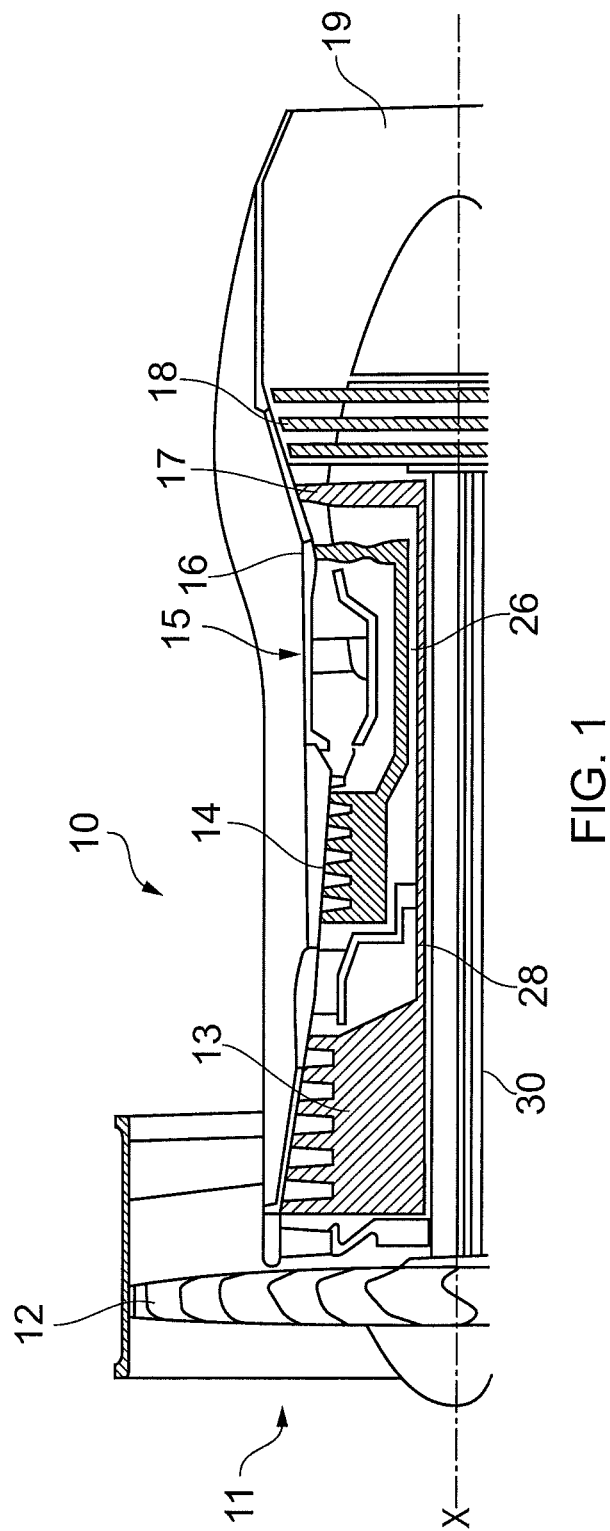
FIG. 1 is partially cut away view of a turbofan gas turbine engine having a wall of a combustion chamber manufactured using a method according to the present invention.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
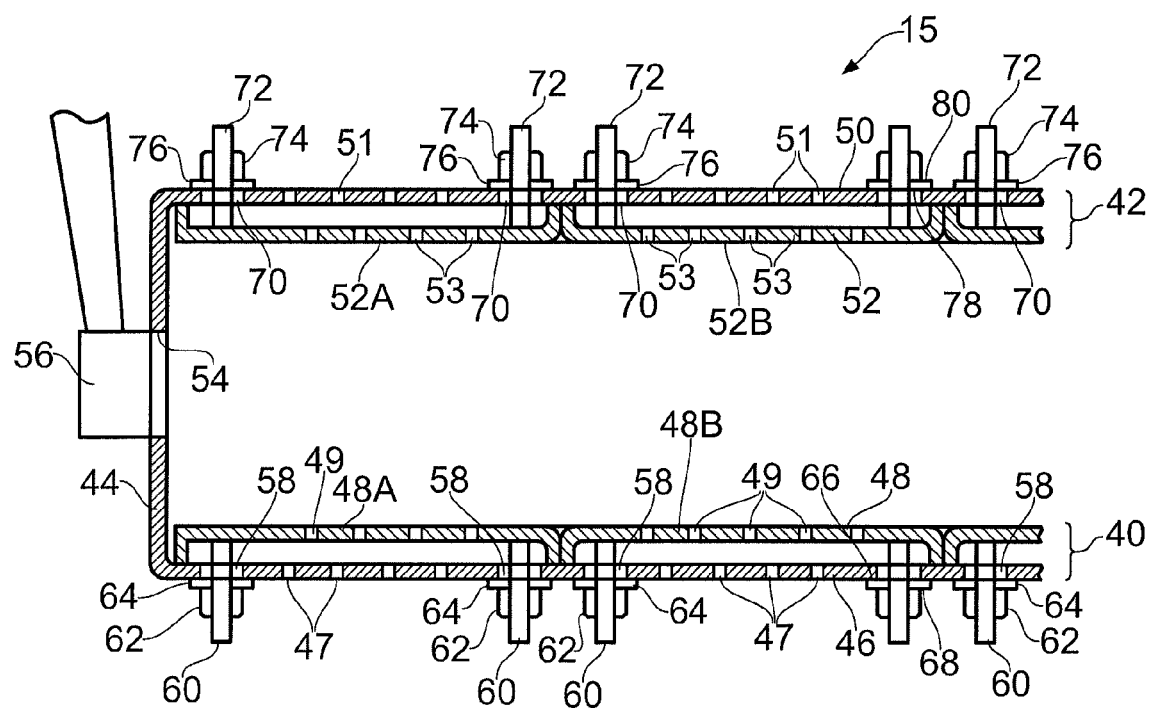
FIG. 2 is an enlarged cross-sectional view of a wall of a combustion chamber manufactured using a method according to the present invention.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The upstream end wall structure 44 has a plurality of circumferentially spaced apertures 54 and each aperture 54 has a respective one of a plurality of fuel injectors 56 located therein. The fuel injectors 56 are arranged to supply fuel into the annular combustion chamber 15 during operation of the gas turbine engine 10.

The first annular wall 46 has a plurality of mounting apertures 58 extending there-though and the second annular wall 48 has a plurality of fasteners 60 extending radially there-from. Each fastener 60 on the second annular wall 48 extends radially through a corresponding mounting aperture 58 in the first annular wall 46. A cooperating fastener 62 locates on each of the fasteners 60 extending through the mounting apertures 58 in the first annular wall 46. A washer 64 is positioned between each fastener 60 on the second annular wall 48 and the cooperating fastener 62. Each washer 64 has a first surface 66 abutting an outer surface of the first annular wall 46 and a second surface 68 abutting a surface of the cooperating fastener 62. The second annular wall 48 comprises a plurality of segments, or tiles, 48A and 48B and the segments, or tiles, 48A and 48B are arranged circumferentially and axially around the first annular wall 46. The axially extending edges of adjacent segments, or tiles, 48A and/or 48B may abut each other or may overlap each other and the circumferentially extending ends of adjacent segments, or tiles, 48A and 48B may abut each other or may overlap each other. The first annular wall 46 also a plurality of impingement cooling apertures 47 extending there-through to direct a flow of coolant onto the outer surfaces of the tiles 48A and 48B of the second annular wall 48. The tiles 48A and 48B of the second annular wall 48 have effusion cooling apertures 49 extending there-though to direct a flow of coolant onto the inner surfaces of the tiles 48A and 48B to form a film of coolant.

Similarly, the third annular wall 50 has a plurality of mounting apertures 70 extending there-though and the fourth annular wall 52 has a plurality of fasteners 72 extending radially there-from. Each fastener 72 on the fourth annular wall 52 extends radially through a corresponding mounting aperture 70 in the third annular wall 50. A cooperating fastener 74 locates on each of the fasteners 72 extending through the mounting apertures 70 in the third annular wall 50. A washer 76 is positioned between each fastener 72 on the fourth annular wall 52 and the cooperating fastener 74. Each washer 76 has a first surface 78 abutting an outer surface of the third annular wall 50 and a second surface 80 abutting a surface of the cooperating fastener 74. The fourth annular wall 52 comprises a plurality of segments, or tiles, 52A and 52B and the segments, or tiles, 52A and 52B are arranged circumferentially and axially adjacent to each other to define the fourth annular wall 52. The axially extending edges of adjacent segments, or tiles, 52A and/or 52B may abut each other or may overlap each other and the circumferentially extending ends of adjacent segments, or tiles, 52A and 52B may abut each other or may overlap each other. The third annular wall 50 also a plurality of impingement cooling apertures 51 extending there-through to direct a flow of coolant onto the outer surfaces of the tiles 52A and 52B of the fourth annular wall 48. The tiles 52A and 52B of the fourth annular wall 52 have effusion cooling apertures 53 extending there-though to direct a flow of coolant onto the inner surfaces of the tiles 52A and 52B to form a film of coolant.

The first annular wall 46 and the second annular wall 48 also have aligned dilution apertures (not shown) extending there-through to supply further combustion air into the annular combustion chamber 15. Similarly the third annular wall 50 and the fourth annular wall 52 also have aligned dilution apertures (not shown) extending there-through to supply further combustion air into the annular combustion chamber 15.

The fasteners 60 and 72 on the second and fourth annular walls 48 and 52 are threaded studs which are cast integrally with the segments, or tiles, 48A, 48B, 52A and 52B or may be secured to the segments, or tiles, 48A, 48B, 52A and 52B by welding, brazing etc. The cooperating fasteners 62 and 74 are nuts.

The first annular wall 46 and/or third annular wall 50 of the combustion chamber 15 is manufactured by an additive manufacturing process, for example selective laser melting, direct laser deposition, powder bed fusion, shaped metal deposition. Powder bed fusion uses a laser beam or an electron beam to melt and fuse powder particles together to build up an article layer by layer from powder material, e.g. powder metal, by moving the laser beam, or electron beam, in a predetermined pattern, or path, across sequentially deposited layers of powder material. Shaped metal deposition uses a welding torch, a laser beam or an electron beam torch to melt and fuse material together to build up an article layer by layer from powder material, e.g. powder metal, or welding rod, metal rod by moving the torch, laser beam or electron beam in a predetermined pattern, or path, and supplying the powder material or welding rod into the path.

Figure 4:
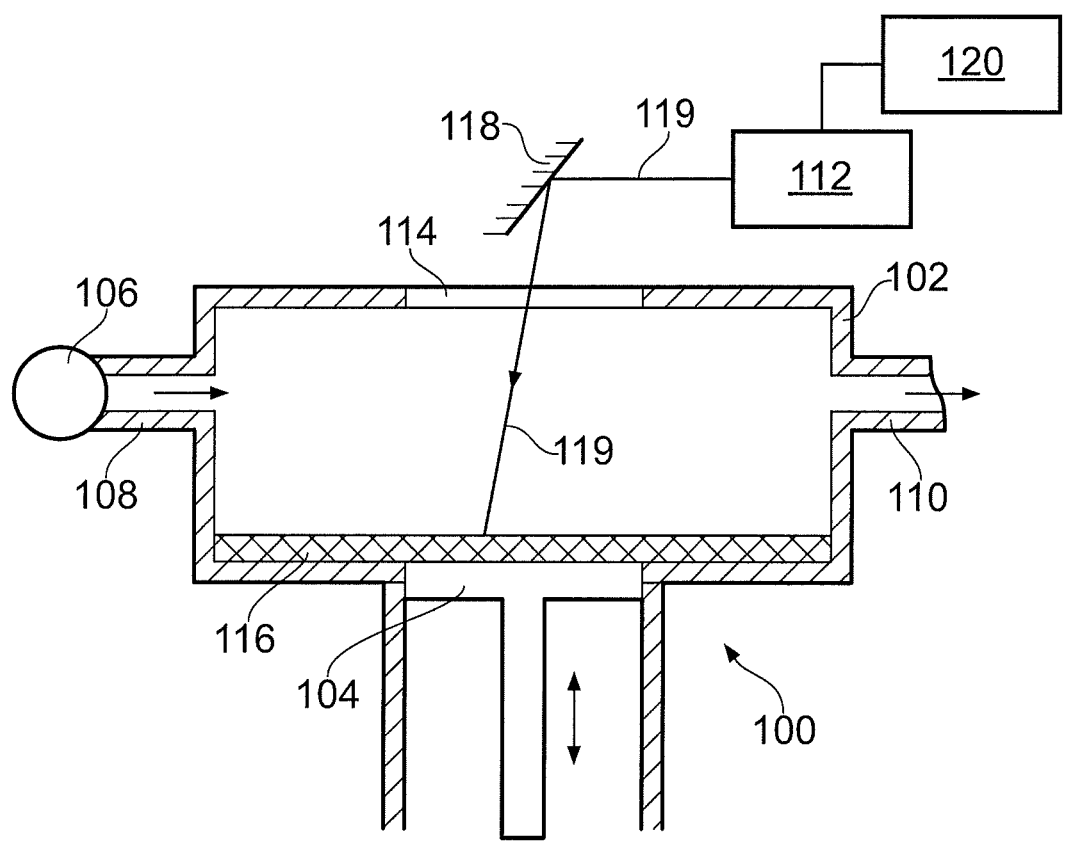
FIG. 4 is an apparatus for manufacturing a wall of a combustion chamber according to the present invention.

The first annular wall 46 and/or third annular wall 50 of the combustion chamber 15 is manufactured for example using selective laser melting or powder bed fusion using an apparatus shown in FIG. 4. The apparatus 100 comprises a sealed chamber 102, which has a retractable platform 104. A pump 106 is provided to supply an inert gas, argon or nitrogen, through a pipe 108 into the chamber 102 and gas is extracted from the chamber 102 via a pipe 110. A laser 112, e.g. an infrared laser, is provided to direct a laser beam 119 through a window 114 in the chamber 102. A controller 120 has a CAD definition of the shape and features of the first annular wall 46 and/or third annular wall 50 of the combustion chamber 15 and the laser 112 is moved under the control of the controller 120.

The first annular wall 46 and/or third annular wall 50 is manufactured by placing a first layer 116 of a suitable metal, or alloy, powder, on the retractable platform 104 in the sealed chamber 102. The laser beam 119 is scanned across the layer of metal powder 116 in a predetermined pattern to form a first layer of the first annular wall 46 and/or third annular wall 50 by bodily moving the laser 112 appropriate distances in perpendicular X and Y directions or by deflecting the laser beam 119 off a movable mirror 118. The laser beam 119 melts and fuses or sinters the metal powder where it strikes the layer of metal powder 116. Then a second, thin, layer of metal, or alloy, is placed on the first layer, the platform 104 is retracted one increment outwards from the chamber 102 and the laser beam 119 is scanned across the layer of metal powder in a further predetermined pattern to form a second layer of the first annular wall 46 and/or third annular wall 50 respectively. The laser beam 119 melts and fuses or sinters the metal powder where it strikes the second layer of metal powder 116 and bonds, fuses or sinters the second layer of the first annular wall 46 and/or third annular wall 50 to the first layer of the first annular wall 46 and/or third annular wall 50 respectively. The process of placing layers of metal powder, retracting the platform 104 and scanning the laser beam 119 across the layer of metal powder in a predetermined pattern to fuse and sinter the metal powder in each layer and to bond each layer to the previously deposited layer is repeated a sufficient number of times to build the first annular wall 46 and/or third annular wall 50 layer by layer from one axial end to the opposite axial end. The predetermined pattern of scanning of the laser beam 119 for each layer is determined by the CAD model of the first annular wall 46 and/or third annular wall 50.

Figure 5:
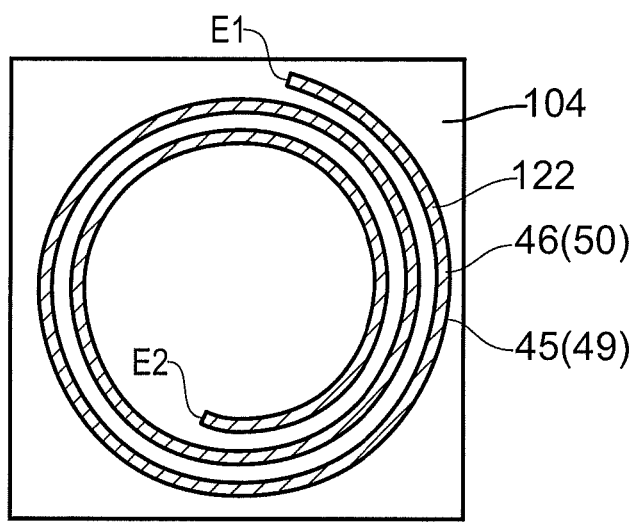
FIG. 5 is a plan view of the wall of the combustion chamber shown in FIG. 2 during the manufacturing process and within the apparatus of FIG. 4.

It is to be noted that the first annular wall 46 and/or third annular wall 50 of the combustion chamber 15 is an annular wall, but the present invention manufactures the first annular wall 46 and/or third annular wall 50 by moving the laser beam 119 in a predetermined spiral pathway 122, as shown in FIG. 5, and thus the metal powder in each layer is melted and fused or sintered to form a spiral to produce each layer of a first spiral wall 45 and/or third spiral wall 49.

Initially a number of the layers of the first spiral wall 45 and/or third spiral wall 49 are solid to define an axial end of the first annular wall 46 and/or third annular wall 50. Then some of the subsequent layers of the first spiral wall 45 and/or third spiral wall 49 have one or more regions where the metal powder in that particular layer of the spiral 122 is not melted and fused or sintered. These regions of the subsequent layers of the first spiral wall 46 and/or third spiral wall 49 where the metal powder is not melted and fused or sintered form apertures through the first spiral wall 49 and/or third spiral wall 49. Some of these apertures may be impingement cooling apertures 47 or 51 to provide cooling of the first annular wall 46 and/or third annular wall 50 respectively and to enable impingement cooling of the second annular wall 48 and/or fourth annular wall 52. Some of these apertures may be dilution apertures 59 or 71 for the first annular wall 46 and third annular wall 50 respectively to provide dilution air into the annular combustion chamber 15. Some of these apertures may be mounting apertures 58 or 70 to enable studs or bolts to inserted through the first annular wall 46 and/or third annular wall 50 to enable the tiles 48A, 48B of the second annular wall 48 and/or the tiles 52A, 52B of the fourth annular wall 52 to be secured to the first annular wall 46 and/or third annular wall 50. Finally a number of the layers of the first spiral wall 45 and/or third spiral wall 49 are solid to define an opposite axial end of the first annular wall 46 and/or third annular wall 50. Thus, the first spiral wall 45 and/or third spiral wall 49 is built up layer by layer by melting and fusing or sintering the metal powder. It is necessary to remove the un-fused, or un-sintered, metal powder from the first spiral wall 45 and/or third spiral wall 49 and this may be by inverting the first spiral wall 45 and/or third spiral wall 49 to pour out the un-fused metal powder. This removal of the un-fused metal powder may be assisted by vibration, air blast etc. The un-fused, or un-sintered, metal powder is removed in particular from the regions forming the apertures in the first spiral wall 45 and/or third spiral wall 49.

Figure 6:
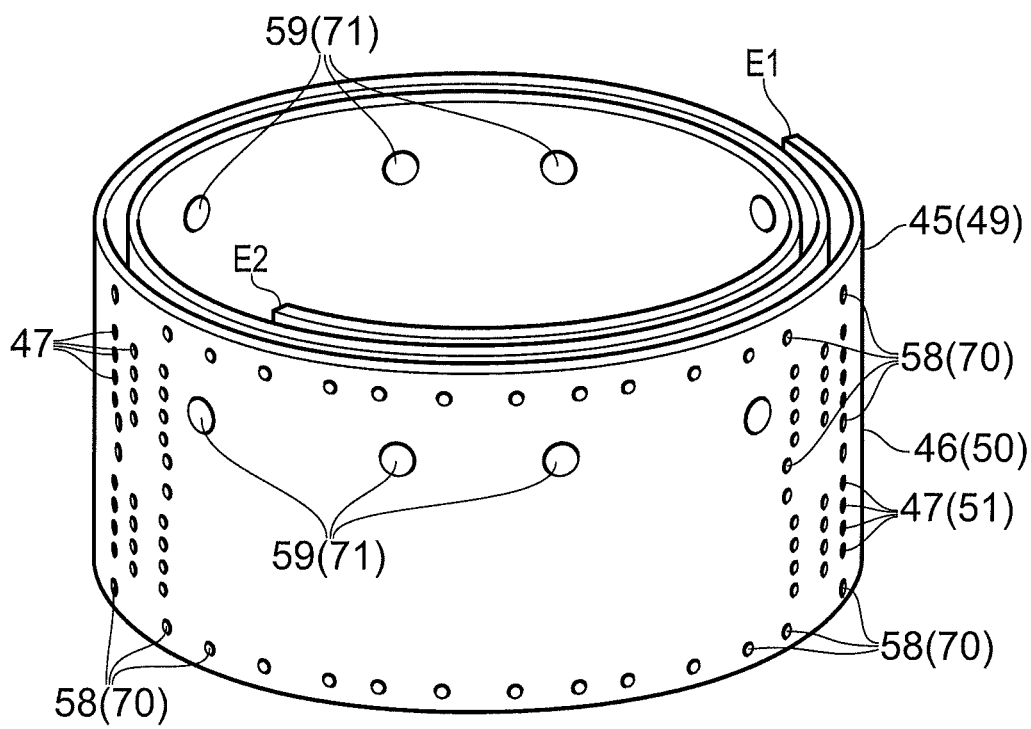
FIG. 6 is a perspective view of the wall of the combustion chamber shown in FIG. 2 during the manufacturing process.
Figure 7:
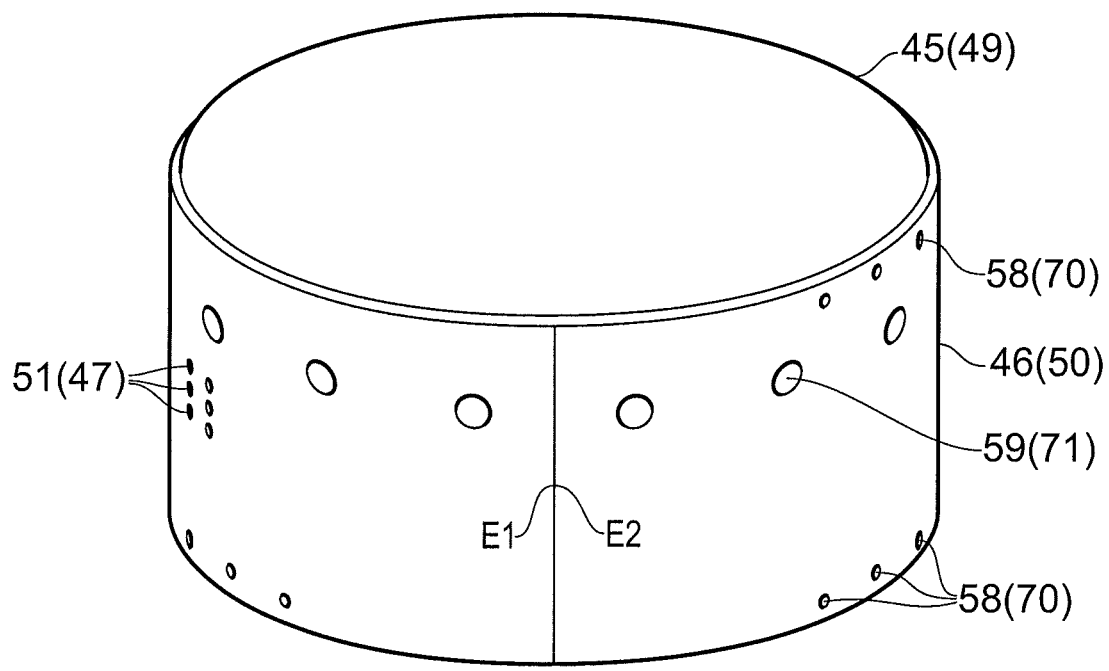
FIG. 7 is a perspective view of the wall of the combustion chamber shown in FIG. 2 at the end of the manufacturing process.

The completed first spiral wall 45 and/or the third spiral wall 49, as shown in FIG. 6, is then removed from the apparatus 100. The completed first spiral wall 45 and/or the third spiral wall 49 is then rolled out to form a ring, e.g. a spilt ring, and the ends E1 and E2 of what was the first spiral wall 45 or third spiral wall 49 are abutted and joined together in an end E1 to end E2 manner as shown in FIG. 7 to form the first annular wall 46 and/or the third annular wall 50. The ends E1 and E2 of the first spiral wall 45 or third spiral wall 49 are joined together by welding, bonding, brazing, bolting or other suitable joining techniques to form the first annular wall 46 and/or the third annular wall 50.

The manufacturing process described above is used to manufacture the first annular wall 46 of the radially inner annular wall structure 40 and/or is used to manufacture the third annular wall 50 of the radially outer annular wall structure 42. Conventional tiles 48A, 48B may then be used to form the second annular wall 48 of the radially inner annular wall structure 40 and similarly conventional tiles 52A, 52B may then be used to form the fourth annular wall 52 of the radially outer annular wall structure 42.

As an example a standard powder bed fusing apparatus has base dimensions of 250 mm by 250 mm and the first and third annular walls 46 and 50 of the annular combustion chamber 15 have diameters much greater than 250 mm.

The first annular wall 46 and the third annular wall 50 have an inner diameter and an outer diameter. The first annular wall 46 and the third annular wall 50 in this example are tubular and the inner diameter of both of the annular walls 46 and 50 is substantially constant along the length of the annular walls 46 and 50, except for flanges, bosses etc, and the outer diameter of both of the annular walls 46 and 50 is substantially constant along the length of the annular walls 46 and 50, except for flanges, bosses etc. Alternatively the annular walls 46 and 50 may be frusto-conical and the inner diameter of both of the annular walls 46 and 50 increases from a first end of the annular wall 46 and 50 to a second end of the annular wall 46 and 50 and the outer diameter of both of the annular walls 46 and 50 increases from the first end of the annular wall 46 and 50 to the second end of the annular wall 46 and 50. The inner diameter and the outer diameter of the annular wall 46 and 50 may increase gradually from the first end to the second end of the annular wall 46 and 50, except for flanges, bosses etc. The inner diameter and the outer diameter of the annular wall 46 and 50 may increase constantly, or in a stepped manner, from the first end to the second end of the annular wall 46 and 50. It may be possible that the first annular wall 46 is tubular and the third annular wall 50 is frusto-conical or visa-versa.

The manufacturing process for a tubular wall involves moving the laser beam along a plurality of spiral pathways, one for each layer of powder metal, and that all the spiral pathways have the same shape and the same length. The manufacturing process for a frustoconical wall is substantially the same as that for a tubular wall except the spiral pathway along which the laser beam is moved is different for each layer of powder metal and in particular the spiral pathway has a different length for each layer of powder metal and so that the spiral pathways progressively increase or decrease in length as the layers of powder metal are deposited.

An advantage of the manufacturing process of the present invention is that it enables the manufacture of a large diameter first annular wall 46 and/or third annular wall 50 within the confines of a powder bed fusion apparatus which has dimensions less than the diameter of the first annular wall 46 and/or third annular wall 50. A further advantage of the manufacturing process of the present invention is that it eliminates the need for forging and turning of a metal billet to produce the first annular wall 46 and/or third annular wall 50 and eliminates the need to drill by machining, electrochemical machining, electro discharge machining, laser machining etc the dilution apertures, cooling apertures and mounting apertures through either or both of these annular walls.

Figure 3:
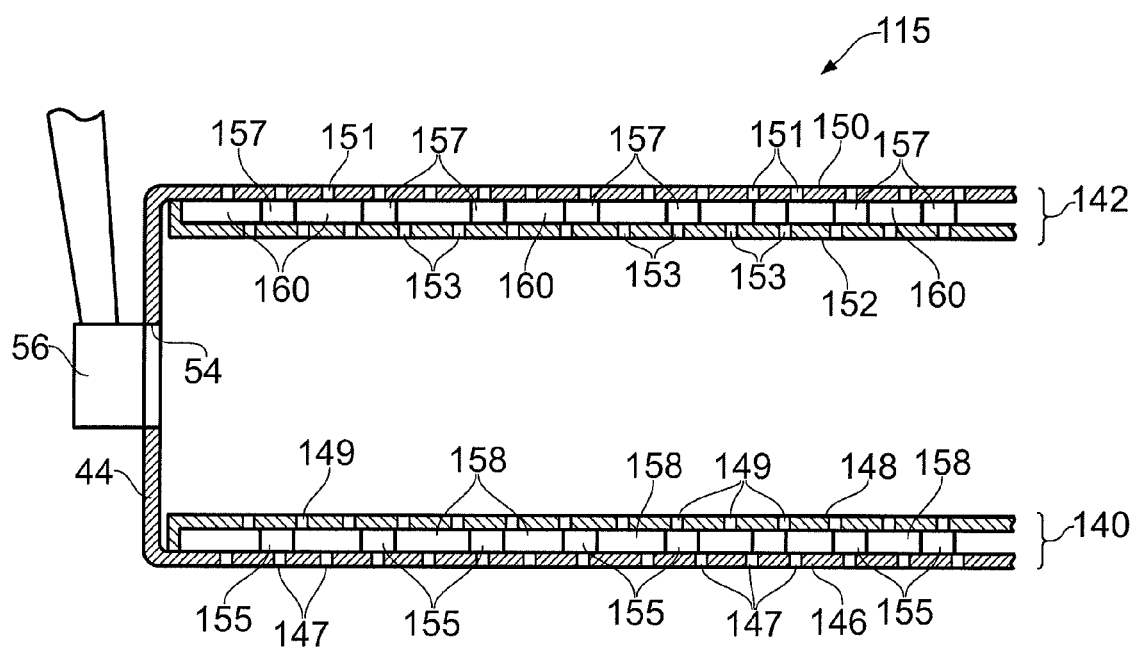
FIG. 3 is an enlarged cross-sectional view of a further wall of a combustion chamber manufactured using a method according to the present invention.

Alternatively the manufacturing process may be used to manufacture the radially inner annular wall structure 140 in a single operation or may be used to manufacture the radially outer annular wall structure 142 of the combustion chamber 115, shown in FIG. 3, in a single operation. In this case the controller 120 has a CAD definition of the shape and features of the radially inner annular wall structure 140 and/or the radially outer annular wall structure 142 of the combustion chamber 115 and the laser 112 is moved under the control of the controller 120. The radially inner annular wall structure 140 is a unitary structure comprising a first annular wall 146 and a second annular wall 148 and interconnecting structures 155. The radially outer annular wall structure 142 is a unitary structure comprising a third annular wall 150 and a fourth annular wall 152 and interconnecting structures 157.

The radially inner annular wall structure 140 and/or the radially outer annular wall structure 142 is manufactured by placing a layer 116 of a suitable metal, or alloy, powder, on the retractable platform 104 in the sealed chamber 102. The laser beam 119 melts and fuses or sinters the metal powder where it strikes the layer of metal powder 116. The laser beam 119 is scanned across the layer of metal powder 116 in a predetermined pattern to form a first layer of the radially inner annular wall structure 140 and/or the radially outer annular wall structure 142 by bodily moving the laser appropriate distances in perpendicular X and Y directions or by deflecting the laser beam off a movable mirror 118. Then a second, thin, layer of metal, or alloy, is placed on the first layer, the platform 104 is retracted one increment outwards from the chamber 102 and the laser beam 119 is scanned across the layer of metal powder in a further predetermined pattern to form a second layer of the radially inner annular wall structure 140 and/or the radially outer annular wall structure 142. The laser beam 119 melts and fuses or sinters the metal powder where it strikes the second layer of metal powder 116 and bonds, fuses or sinters the second layer of the radially inner annular wall structure 140 and/or the radially outer annular wall structure 142 to the first layer of the radially inner annular wall structure 140 and/or the radially outer annular wall structure 142 respectively. The process of placing layers of metal powder, retracting the platform 104 and scanning the laser beam 119 across the layer of metal powder in a predetermined pattern to fuse and sinter the metal powder in each layer and to bond each layer to the previously deposited layer is repeated a sufficient number of times to build the radially inner annular wall structure 140 and/or the radially outer annular wall structure 142 layer by layer from one axial end to the opposite axial end. The predetermined pattern of scanning of the laser beam for each layer is determined by the CAD model of the radially inner annular wall structure 140 and/or the radially outer annular wall structure 142.

The radially inner annular wall structure 140 and the radially outer annular wall structure 142 are complex hollow annular wall structures and have complex cooling arrangements. As mentioned above the radially inner annular wall structure 140 comprises a first annular wall 146, a second annular wall 148 and interconnecting structures 155 and the interconnecting structures 155 between the first annular wall 146 and the second annular wall 148 define the complex cooling arrangement 158 between the first annular wall 146 and the second annular wall 148 and apertures 147 in the first annular wall 146 allow for the flow of coolant into the complex cooling arrangement 158 within the radially inner annular wall structure 140 and the apertures 149 in the second annular wall 148 allow for a flow of coolant out of the complex cooling arrangement 158 within the radially inner annular wall structure 140. Similarly the radially outer annular wall structure 142 comprises a third annular wall 150, a fourth annular wall 152 and interconnecting structures 157 and the interconnecting structures 157 between the third annular wall 150 and the fourth annular wall 152 define the complex cooling arrangement 160 between the third annular wall 150 and the fourth annular wall 152 and apertures 151 in the third annular wall 150 allow for the flow of coolant into the complex cooling arrangement 160 within the radially outer annular wall structure 142 and the apertures 153 in the fourth annular wall 152 allow for a flow of coolant out of the complex cooling arrangement 160 within the radially outer annular wall structure 142.

The laser beam is scanned across the layers of metal powder 116 in predetermined patterns to form each of the layers of the first annular wall 146 and the second annular wall 148 and interconnecting structures 155 there-between of the radially inner annular wall structure 140 and/or third annular wall 150 and the fourth annular wall 152 and interconnecting structures 157 there-between of the radially outer annular wall structure 142. Some of the layers have regions where the metal powder is not melted and fused or sintered to form aligned dilution apertures through the first annular wall 146 and the second annular wall 148 and/or the third annular wall 150 and the fourth annular wall 152. Some of the layers have regions where the metal powder is not melted and fused or sintered to form impingement cooling apertures 147 and 151 through the first annular wall 146 and/or the third annular wall 150 respectively and effusion cooling apertures 149 and 153 through the second annular wall 148 and/or the fourth annular wall 152 respectively. The interconnecting structures 155 and 157 may be circular pedestals, triangular pedestals, square pedestals, rectangular pedestals, elongate pedestals, other suitable shapes of pedestals etc or may include additional annular walls and pedestals etc to form the complex cooling arrangement 158 and 160 between the first annular wall 146 and the second annular wall 148 and/or between the third annular wall 150 and the fourth annular wall 152 respectively. The interconnecting structures 155 together with the first annular wall 146 and the second annular wall 148 and/or the interconnecting structures 157 together with the third annular wall 150 and the fourth annular wall 152 respectively may be arranged to form a laminated radially inner annular wall structure 140 and/or a laminated radially outer annular wall structure 142. It is to be noted in this example that the metal powder of the first annular wall 146, the second annular wall 148 and the interconnecting structures 155 are all fused together to form an integral structure and thus in this case the first annular wall 146, the second annular wall 148 and the interconnecting structures 155 of the radially inner annular wall structure 140 define a single integral structure and/or the metal powder of the third annular wall 150, the fourth annular wall 152 and the interconnecting structures 157 are all fused together to form an integral structure and thus in this case the third annular wall 150, the fourth annular wall 152 and the interconnecting structures 157 of the radially outer annular wall structure 142 define a single integral structure.

It is to be noted that the radially inner annular wall structure 140 and/or the radially outer annular wall structure 142 of the combustion chamber 115 is an annular wall, but the present invention manufactures the radially inner annular wall structure 140 and/or the radially outer annular wall structure 142 by moving the laser beam 119 in a predetermined spiral pathway 122, as shown in FIG. 5, and thus the metal powder in each layer is melted and fused or sintered to form a spiral to produce each layer of a radially inner spiral wall structure and/or a radially outer spiral wall structure.

The completed radially inner spiral wall structure and/or the radially outer spiral wall structure is then removed from the apparatus 100. The completed radially inner spiral wall structure and/or the radially outer spiral wall structure is then rolled out to form a ring, e.g. a spilt ring, and the ends E1 and E2 of what was the radially inner or outer spiral wall structure are abutted and joined together in an end to end manner to form the radially inner annular wall structure 140 or radially outer annular wall structure 142. The ends of the radially inner spiral wall structure or radially outer spiral wall structure are joined together by welding, bonding, brazing, bolting or other suitable joining techniques.

The further advantage of this manufacturing process is that it eliminates the need to separately manufacture, cast, the tiles for the second annular wall of the radially inner annular wall structure and/or the tiles for the fourth annular wall of the radially outer annular wall structure and it also eliminates the need to drill cooling apertures through the tiles. Additional advantages are that this reduces the time and cost to manufacture the annular walls, reduces the number of parts, reduces the requirement for machine tools except for the fused powder bed, or shaped metal deposition tool. A further significant advantage is that the radially inner annular wall structure and/or the radially outer annular wall is a single integral structure and it is easy to provide complex or intricate cooling patterns and/or arrangement of cooling passages within and through the radially inner annular wall structure and/or the radially outer annular wall by selection of an appropriate interconnecting structure.

Alternatively the method described with reference to FIG. 3 may be used to produce Lamilloy® in which case the completed spiral wall structure is rolled flat and then this may be cut into smaller pieces to make portions of a wall of a combustion chamber. The advantage of this is that it enables a cost effective production of Lamilloy®.

Although the present invention has been described with reference to the use of a laser beam to provide selective laser melting and fusing/sintering of the metal powder it may be possible to use other types of radiation beam, for example microwave radiation to provide selective microwave melting or electron beam radiation to provide selective electron beam melting etc.

It may be possible to manufacture the first annular wall of the radially inner annular wall structure and/or the third annular wall of the radially outer annular wall using shaped metal deposition by depositing molten metal from a welding torch. The use of shaped metal deposition would be substantially the same as that described with reference to selective laser sintering and would use a controller which has a CAD definition of the shape and features of the first annular wall of the radially inner annular wall structure and/or the third annular wall of the radially outer annular wall of the combustion chamber and the welding torch is moved under the control of the controller.

Alternatively, it may be possible to manufacture the radially inner annular wall structure and/or the radially outer annular wall structure using shaped metal deposition by depositing molten metal from a welding torch. The use of shaped metal deposition would be substantially the same as that described with reference to selective laser sintering and would use a controller which has a CAD definition of the shape and features of the radially inner annular wall structure and/or the radially outer annular wall structure of the combustion chamber and the welding torch is moved under the control of the controller.

Preferably the metal powder is a nickel base superalloy or a cobalt base superalloy but other suitable alloys may be used.

The advantage of the present invention is that it enables the manufacture of a large diameter annular wall within the confines of a powder bed fusion apparatus which has dimensions less than the diameter of the annular wall. A further advantage of the present invention is that it enables an annular wall with cooling apertures to be manufactured.

Although the present invention has been described with reference to manufacturing an annular wall of a gas turbine engine combustion chamber it is equally applicable to the manufacture of an annular wall of a combustion chamber of other engines or apparatus.

Although the present invention has been described with reference to manufacturing an annular wall of a gas turbine engine combustion chamber it is equally applicable to the manufacture of an annular wall for other purposes, e.g. an annular casing. The annular casing may be an annular fan casing, an annular compressor casing, an annular combustion chamber casing, an annular turbine casing or a combined combustion chamber and turbine casing of a gas turbine engine. These annular casings may have annular flanges extending radially outwardly and/or radially inwardly which are formed during the forming of the spiral wall. These annular casings may have variations in thickness axially along their length which are formed during the forming of the spiral wall. These annular casings may have local bosses which are formed during the forming of the spiral wall. A combined combustion chamber and turbine casing comprises a combustion chamber casing and at least a high pressure turbine casing. It may also comprise an intermediate pressure turbine casing.

The present invention may be used to manufacture a hollow wall with internal interconnecting supporting structure to reduce the weight of the wall by forming a wall as described above and rolling the hollow wall flat. The flat hollow wall may be cut into a plurality of flat hollow wall portions.

The invention claimed is:

1. A method of manufacturing a wall, the method comprising
    (a) depositing layers of a metal sequentially one upon the other to form layers of a spiral wall, depositing each layer of metal in a spiral pathway, and
    (b) abutting and joining the ends of the spiral wall to form an annular wall, the ends of the spiral wall being at the opposite ends of the spiral pathway.

2. The method as claimed in claim 1 wherein step (b) comprises rolling the spiral wall into a ring before joining the ends of the spiral wall together.

3. The method as claimed in claim 1 wherein step (a) comprises controlling the deposition of the layers of metal to form apertures in the spiral wall.

4. The method as claimed in claim 1 wherein step (a) comprises:
    (i) depositing a layer of a metal powder onto a platform,
    (ii) directing a radiation beam in at least one spiral pathway onto the layer of metal powder deposited in step (i) to melt and sinter the metal powder to form a layer of the spiral wall,
    (iii) depositing a further layer of a metal powder onto the previously deposited layer of metal powder,
    (iv) directing a radiation beam in at least one spiral pathway onto the layer of powder metal deposited in step (iii) to melt and sinter the metal powder to form a further layer of the spiral wall and to bond the further layer of metal powder to the previously deposited layer of metal powder, and
    (v) repeating steps (iii) and (iv) a plurality of times to build up the spiral wall.

5. The method as claimed in claim 4 wherein step (ii) is selected from the group consisting of directing a laser beam onto the layer of metal powder, directing a microwave beam onto the layer of metal powder and directing an electron beam onto the layer of metal powder.

6. The method as claimed in claim 4 wherein step (iv) is selected from the group consisting of directing a laser beam onto the layer of metal powder, directing a microwave beam onto the layer of metal powder and directing an electron beam onto the layer of metal powder.

7. The method as claimed in claim 4 wherein step (a) is performed in a fused powder bed apparatus, the fused powder bed apparatus having base dimensions of 250 mm by 250 mm and the diameter of the annular wall is greater than 250 mm.

8. The method as claimed in claim 1 wherein step (a) comprises:
    (i) depositing a layer of a molten metal in at least one spiral pathway onto a platform to form a layer of the spiral wall,
    (ii) depositing a further layer of molten metal in at least one spiral pathway on the previously deposited layer of molten metal to form a further layer of the spiral wall and to bond the further layer of the spiral wall to the previously deposited layer of the spiral wall, and
    (iii) repeating step (ii) a plurality of times to build up the spiral wall.

9. The method as claimed in claim 8 wherein steps (i) and (ii) comprise depositing the layer of molten metal using a welding torch.

10. The method as claimed in claim 9 comprising depositing the layer of molten metal using a TIG welding torch.

11. The method as claimed in claim 8 wherein steps (i) and (ii) comprise depositing the layer of molten metal by direct laser deposition.

12. The method as claimed in claim 1 wherein the annular wall is an annular wall of a combustion chamber.

13. The method as claimed in claim 12 wherein step (a) comprises controlling the deposition of the layers of metal to form apertures in the spiral wall.

14. The method as claimed in claim 13 wherein the apertures in the spiral wall are selected from the group consisting of dilution apertures, cooling apertures and mounting apertures.

15. The method as claimed in claim 12 wherein step (a) comprises depositing additional layers of a metal sequentially one upon the other to form layers of an additional spiral wall, each of the additional layers of metal being deposited in a spiral pathway, the additional spiral wall being spaced radially from the spiral wall, and depositing metal so as to interconnect the spiral wall and the additional spiral wall.

16. The method as claimed in claim 15 wherein step (a) comprises controlling the deposition of the additional layers of metal to form apertures in the additional spiral wall.

17. The method as claimed in claim 16 wherein the apertures in the additional spiral wall are selected from the group consisting of dilution apertures and cooling apertures.

18. The method as claimed in claim 12 wherein step (a) comprises depositing layers of metal sequentially one upon the other to form a first spiral wall, a second spiral wall spaced from the first spiral wall and interconnecting structure connecting the first spiral wall and the second spiral wall to form a hollow spiral wall, and step (b) comprises abutting and joining the ends of the hollow spiral wall to form a hollow annular wall.

19. The method as claimed in claim 18 wherein step (a) comprises controlling the deposition of the layers of metal to form apertures in the first spiral wall and the second spiral wall.

20. The method as claimed in claim 19 wherein the apertures in the first spiral wall and the second spiral wall are selected from the group consisting of dilution apertures and cooling apertures.

21. The method as claimed in claim 1 wherein the annular wall is an annular casing.

22. The method as claimed in claim 21 wherein the annular casing is selected from the group consisting of a fan casing, a compressor casing, a combustion casing, a turbine casing and a combined combustion and turbine casing.

23. The method as claimed in claim 21 comprising forming at least one annular flange, the annular flange is selected from the group consisting of an annular flange extending radially inwardly from the annular casing and an annular flange extending radially outwardly from the annular casing.

24. The method of manufacturing a plurality of wall portions, the method comprising
    (a) depositing layers of a metal sequentially one upon the other to form layers of a spiral wall, depositing each layer of metal in a spiral pathway, and
    (b) cutting the spiral wall into portions to form the plurality of wall portions.

25. The method as claimed in claim 24 wherein step (b) comprises rolling the spiral wall flat before cutting the spiral wall into the plurality of wall portions.

26. A method of manufacturing a wall, the method comprising
    (a) depositing layers of a metal sequentially one upon the other to form layers of a spiral wall, and
    (b) abutting and joining the ends of the spiral wall to form an annular wall, the ends of the spiral wall being at the opposite ends of the spiral wall,
    wherein step (a) comprises:
    (i) depositing a layer of a metal powder onto a platform,
    (ii) directing a radiation beam onto the layer of metal powder deposited in step (i) and scanning the radiation beam across the layer of metal powder in a predetermined pattern to melt and sinter the metal powder to form a layer of the spiral wall,
    (iii) depositing a further layer of a metal powder onto the previously deposited layer of metal powder,
    (iv) directing a radiation beam onto the layer of powder metal deposited in step (iii) and scanning the radiation beam across the layer of metal powder in a predetermined pattern to melt and sinter the metal powder to form a further layer of the spiral wall and to bond the further layer of metal powder to the previously deposited layer of metal powder, and
    (v) repeating steps (iii) and (iv) a plurality of times to build up the spiral wall.

\* \* \* \* \*